United States Patent [19]

Lopes

[11] Patent Number: 5,180,034
[45] Date of Patent: Jan. 19, 1993

[54] ADAPTIVE LUBRICATION OIL SYSTEM

[75] Inventor: Wiliam F. Lopes, Groton, Mass.

[73] Assignee: General Electric Co., Schectady, N.Y.

[21] Appl. No.: 624,698

[22] Filed: Dec. 6, 1990

[51] Int. Cl.5 .............................................. F01M 9/00
[52] U.S. Cl. ................................... 184/6.1; 184/6.11; 60/39.08; 60/657; 60/660
[58] Field of Search ...................... 184/6.11, 6.1, 6.4, 184/7.4, 108; 60/39.08, 646, 657, 660; 440/88; 415/17, 30, 33, 39; 417/42, 22, 24, 251

[56] References Cited

U.S. PATENT DOCUMENTS

| | | | |
|---|---|---|---|
| 2,486,049 | 10/1949 | Miller | 115/35 |
| 3,139,062 | 6/1964 | Keefe | 115/35 |
| 3,217,941 | 11/1965 | Fishburne | 222/333 |
| 3,407,600 | 10/1968 | Meyer | 60/54 |
| 3,509,721 | 5/1970 | Crawford | 60/53 |
| 3,587,511 | 4/1969 | Buddrus | 115/34 |
| 3,749,464 | 7/1973 | Satterthwaite | 308/36.1 |
| 3,915,111 | 10/1975 | Buddrus | 115/34 A |
| 4,008,003 | 2/1977 | Pinkerton | 417/251 |
| 4,088,087 | 5/1978 | Nitta | 114/150 |
| 4,316,722 | 2/1982 | Aschauer | 440/74 |
| 4,446,377 | 5/1984 | Kure-Jensen et al. | 184/6.11 |
| 4,708,594 | 11/1987 | Shinmei et al. | 417/42 |
| 4,708,674 | 11/1987 | Matsumoto | 440/88 |
| 4,735,590 | 4/1988 | Mondel | 440/88 |
| 4,808,896 | 2/1989 | Katsuragi et al. | 318/436 |
| 4,871,332 | 10/1989 | Rodriguez | 440/5 |
| 4,887,984 | 12/1989 | Newman | 440/86 |

FOREIGN PATENT DOCUMENTS

| | | | |
|---|---|---|---|
| 0291710 | 12/1986 | Japan | 184/6.11 |
| 0291711 | 12/1986 | Japan | 184/6.11 |
| 0255505 | 11/1987 | Japan | 184/6.11 |

Primary Examiner—Ira S. Lazarus
Assistant Examiner—Alan B. Cariaso
Attorney, Agent, or Firm—Nixon & Vanderhye

[57] ABSTRACT

An adaptive oil lubrication system for a marine propulsion system having a variable speed oil pump controlled by a microprocessor. The speed of the pump and, thus, the oil flow rate is varied to track the demand for lubrication by the propulsion system. A microprocessor monitors the propulsion system and calculates the appropriate speed of the oil pump to generate the oil flow needed by the propulsion system.

11 Claims, 3 Drawing Sheets

ADAPTIVE LUBRICATION OIL SYSTEM

FIELD OF THE INVENTION

This invention relates to an oil lubrication system that regulates oil flow volume and pressure in response to the operating conditions of the system being lubricated.

BACKGROUND AND SUMMARY OF THE INVENTION

Ships and submarines are powered by steam and combustion turbine propulsion systems. Large reduction gears transfer rotational work from the turbines to the drive shafts rotating the ship propellers. These gears require a voluminous flow of lubricating oil. Oil is also used to lubricate the prime mover bearings and other components of the propulsion system.

A marine propulsion system must always have an adequate amount of lubrication oil being supplied to its gears, bearings and other components. To properly lubricate gears and bearings, the oil must form a thin film between the gear teeth and bearing surfaces. The oil film prevents opposing metal surfaces from coming into contact with each other. By preventing metal-to-metal contact, the lubricating oil film protects the metal surface from wear and other harmful effects. The oil also act as a coolant for the gears, bearings and other components of the propulsion system. The oil removes heat as it flows through the propulsion system.

An insufficient amount of lubricating oil can cause the reduction gears, bearings and other components to wear at unacceptably high rates. An inadequate amount of oil may result in excessive frictional heating of the propulsion system. A complete lack of oil can cause the gears and bearings to seize or otherwise fail.

The amount of oil necessary to lubricate a propulsion system varies with the operating condition of the system. When a ship or submarine is traveling at high speed its propeller and turbines are also rotating at high speeds. The forces transmitted from the turbines by the reduction gears to the propeller shafts are greatest when the ship or submarine is moving fast. High rotation speeds in the propulsion system and large forces in the reduction gears require large volumes of lubricating oil at relatively high pressure.

As shown in FIG. 3, the flow demand for lubricating oil increases as the speed of the ship increases. At slow speeds, the propulsion system requires much less oil than it requires at high speeds. Accordingly, the volume of oil needed varies greatly with the operation of the ship.

To provide an adequate supply of oil at all operating conditions, conventional lubricating system are sized to constantly provide the maximum volume of oil. Conventional lubricating systems employ single speed motor driven positive displacement pumps. These pumps are extremely reliable but deliver oil at a constant rate. For a constant supply of oil to satisfy a varying demand for lubricating oil, the supply must be at the level of maximum demand. Thus, pumps in conventional systems constantly provide oil at the maximum operational demand of the propulsion system.

Conventional lubricating systems with single speed pumps circulate oil through the reduction gears, bearings and other propulsion components at a uniform pressure and volume corresponding to the maximum demand for oil. When the propulsion system does not require the maximum amount of oil, then the amount of lubricating oil supplied to the propulsion system is excessive.

Continually providing the maximum rate of oil results in a considerable mismatch between the demand and supply of oil. The excessive supply of oil flowing through the propulsion system increases the losses of the components in the propulsion and lubrication systems. In addition, the lubricating system is noisy when operating at maximum capacity. Since it is always operating at maximum capacity, the lubrication system is always noisy.

To regulate the amount of oil circulating through the propulsion system, some conventional lubrication systems include an oil recirculator. The recirculator accommodates excessive oil flow when the propulsion system does not require a maximum volume of oil. Even with a recirculator, the oil pump operates a constant maximum rate. But, the recirculator keeps some of the oil from flowing to the propulsion system. Oil not needed by the reduction gears, bearings and other components is diverted into the recirculator. When the load on the propulsion system decreases, the volume of lubrication oil circulating through the system is correspondingly reduced and the volume flowing into the recirculator increases.

An oil recirculator mitigates some of the losses and other harmful effects caused by constantly circulating large amounts of oil through the propulsion system. Noise is not reduced by a recirculator. Pump noise remains high because the pump is still operating at a maximum state. In addition, the recirculator itself increases the noise level of the lubrication system.

Two speed positive displacement pumps have been used for single speed pumps to more closely match the lubrication requirements of the propulsion system than does a single speed pump. Two speed pumps supply lubricating oil at two flow rates—a maximum rate and an intermediate rate. The maximum rate satisfies the maximum demand for lubricating oil made by the propulsion system. The intermediate rate provides an adequate amount of lubrication oil when the propulsion system is operating at or below a preselected intermediate power level. The advantage of a two-speed pump is that it is not always operating at a maximum speed. At or below the preselected propulsion power level, the oil pump is operating at an intermediate capacity that is quieter and less wearing on the lubrication and propulsion system than is the maximum capacity of the pump.

The lubrication requirements of a ship's propulsion system is shown in FIG. 3. The volume of lubricant required by the propulsion system increases with the speed of the ship as shown by dotted line 1. At maximum speed, the propulsion always operating at a maximum speed. At or below the preselected propulsion power level, the oil pump is operating at an intermediate capacity that is quieter and less wearing on the lubrication and propulsion system than is the maximum capacity of the pump.

The lubrication requirements of a ship's propulsion system is shown in FIG. 3. The volume of lubricant required by the propulsion system increases with the speed of the ship as shown by dotted line 1. At maximum speed, the propulsion system requires a maximum volume of lubrication. A single speed pump constantly supplies this maximum amount of oil for all ship speeds as is shown by line 2. As shown by dotted line 3, a two-speed pump provides the maximum oil flow when the propulsion system is operating above a predetermined speed level 4 and a lower volume of oil when the propulsion system is operating below this level. As can be seen from FIG. 3, the lubrication oil flow provided by one-and two-speed pumps does not closely track the volume of oil 1 required by the propulsion system. With both types of pumps, a great deal more lubrication oil is supplied than is demanded by the propulsion system. This excess oil supply increases noise and causes unnecessary wear in the system.

The present invention is a variable speed lubrication pump controlled by a microprocessor. The discharge flow rate and pressure of the oil pump varies with it speed. The microprocessor adjusts the rate of oil supplied by the pump to closely track the amount of oil required by the propulsion system. As shown by the variable oil supply line 5 in FIG. 3, the supply of lubrication oil tracks the demand for oil, but is always slightly greater than the demand. The lubrication system adapts to the demand for lubricant.

The microprocessor control is programmed with algorithms and/or tables that correlate the operating condition of the propulsion system, to the amount of lubrication oil required by the propulsion system. Methods for programming microprocessors are well known. The microprocessor receives signals from sensors indicative of the rotational speed of the propulsion turbine, the setting of the propulsion turbine control valve, the throttle setting forth the propulsion system, the speed of the ship and the speed of the lubrication pump and possibly other information. With this information, the microprocessor calculates whether the variable speed pump should rotate faster, slower or hold a constant speed. In this way, the lubrication flow to the propulsion system is continually adjusted to a level slightly above the volume of lubrication needed by the propulsion system.

The adaptive lubrication oil system of the present invention may also include a two-stage pump. Such pumps are most useful in propulsion systems that have a combined lubrication and hydraulic oil system. Hydraulic oil must often be provided at pressures much greater than that demanded of lubrication oil. A two-stage pump has a high pressure discharge providing oil to the hydraulic system and a low speed discharge providing oil to the lubrication system.

For a conventional single speed pump to supply oil to a combined lubrication and hydraulic system would require the pump to continuously provide oil to both systems at the maximum pressure needed by the hydraulic system. Such a conventional system would be exceedingly noisy and may have many other undesirable effects. Substituting a two-speed pump would reduce but not eliminate these undesirable effects.

A two-pressure, variable speed pump satisfies the requirements for a combined system lubrication and hydraulic system without creating extra noise or supplying high pressure oil where it is not needed. A microprocessor can monitor the demands for high and low pressure oil and adjust the operation of the pump accordingly.

DETAILED DESCRIPTION OF THE DRAWINGS

Figure 1:
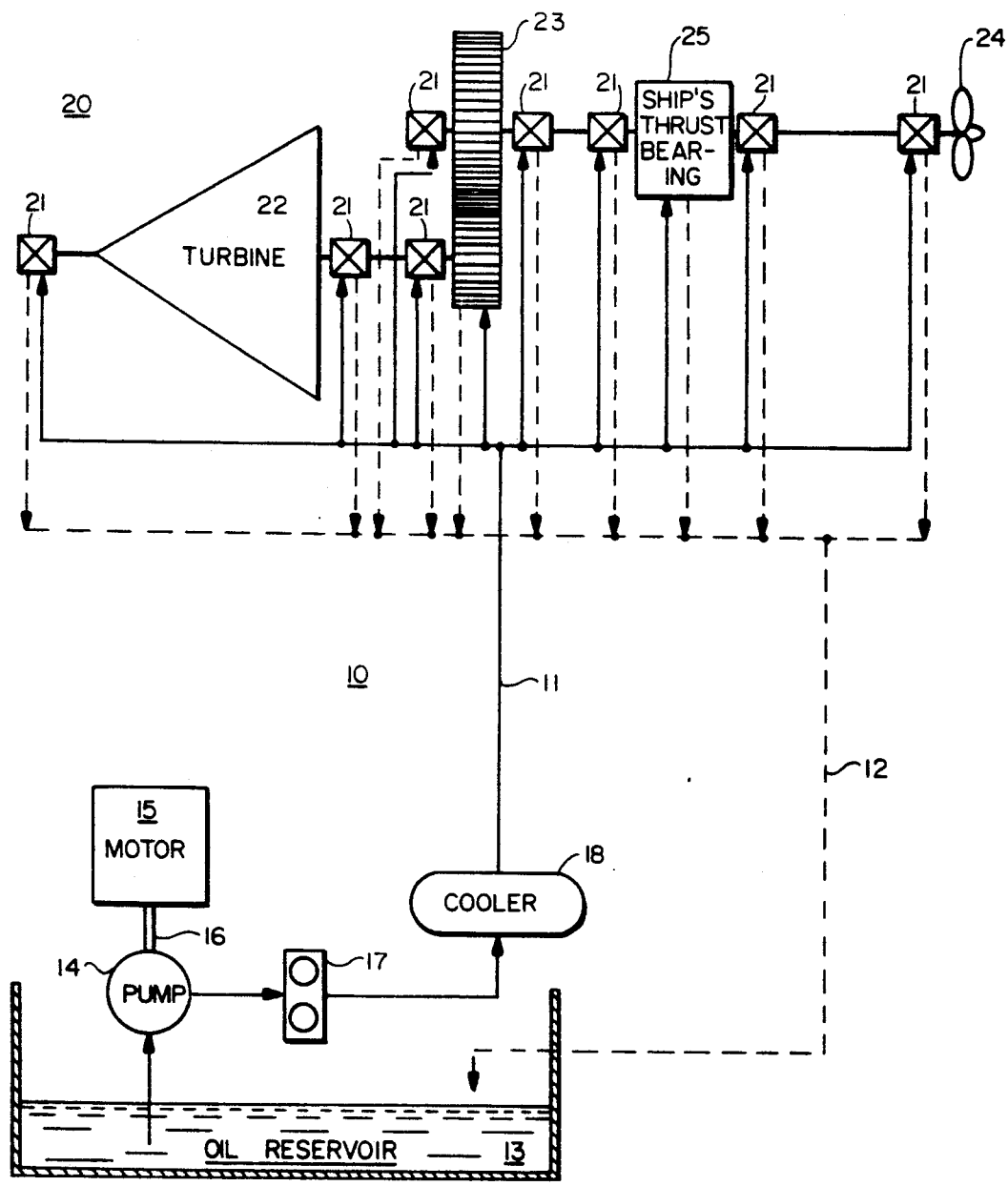
FIG. 1 is a schematic illustration of a typical oil lubrication system for a marine propulsion system.

FIG. 1 illustrates a typical oil lubrication system 10 for a marine propulsion system 20. The lubrication system supplies oil to the propulsion system through a network of lubrication lines 11, 12 that provide oil to the propulsion system. Persons skilled in the art are familiar with the operation and structure of the lubrication system shown in FIG. 1.

The lubrication system includes an oil reservoir 13 that stores oil to be circulated through the system. A pump 14 draws oil out of the reservoir. There are many kinds of pumps that can be used in the lubrication system. Conventional systems have single or double-speed pumps. The present invention has a variable speed pump. The variable speed pump may, for example, have a rotating impeller that applies centrifugal forces to increase the pressure and/or flow rate of the oil. A motor 15 powers the pump. The motor has a rotating shaft 16 that rotates the impeller of the pump. The operation of the variable speed pump is described in more detail below.

The oil exits the pump 14 at a higher pressure and/or velocity than it entered the pump. The oil then passes through a filter 17 that removes particles and other impurities from the oil. From the filter, the temperature of the oil is reduced in a cooler 18. The oil is heated by the pump and as it passes between bearings, gears and other moving components in the propulsion system. The viscosity of the oil drops as its temperature rises. If the oil becomes too hot, it can degrade. In addition, the oil itself serves as a coolant liquid flowing through the propulsion system. Accordingly, a cooler 18 is used to reduce the temperature of the oil.

From the cooler, the oil proceeds to the propulsion system through inflow oil lines 11. These lines direct the oil to the bearings 21 that support the shafts for the power turbine 22, the reduction gears 23, propeller 24, thrust bearing 25 and other components of the propulsion system. These bearings and reduction gears are well-known.

The tremendous size of the reduction gears and turbines used to propel large ships require substantial quantities of lubricating oil. The oil must be under sufficient pressure and have an adequate amount of flow to satisfying the lubrication needs of the entire propulsion system. Once the oil passes through the bearings, gears and other components of the propulsion system it travels by the return oil lines 12 back to the oil reservoir 13.

In addition, if the lubrication and hydraulic systems are combined, then oil lines also extend to the hydraulic system (not shown) in the same manner they extend to the propulsion system. The hydraulic systems operate the control valves for the propulsion system. Given the large size of some marine propulsion systems, the hydraulic system uses oil at a relatively high pressure to move the large control valves and other propulsion control mechanisms.

Figure 2:
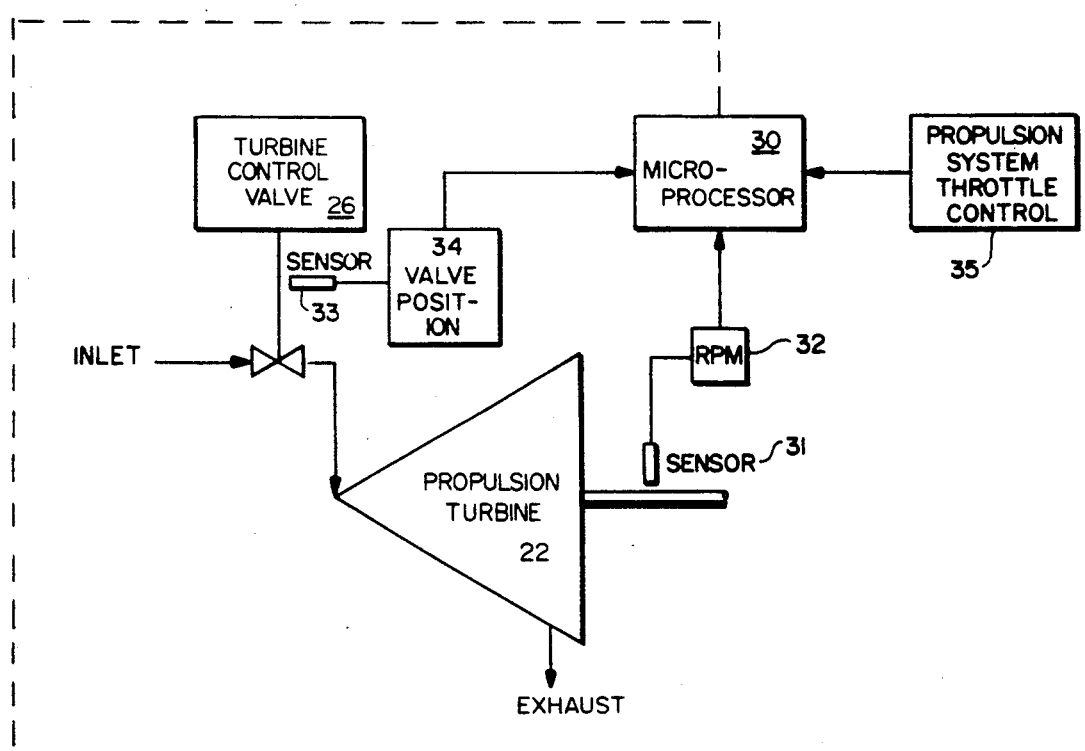
FIG. 2 is a block diagram of one exemplary embodiment of the invention showing a microprocessor controlled variable speed oil pump.
Figure 2:
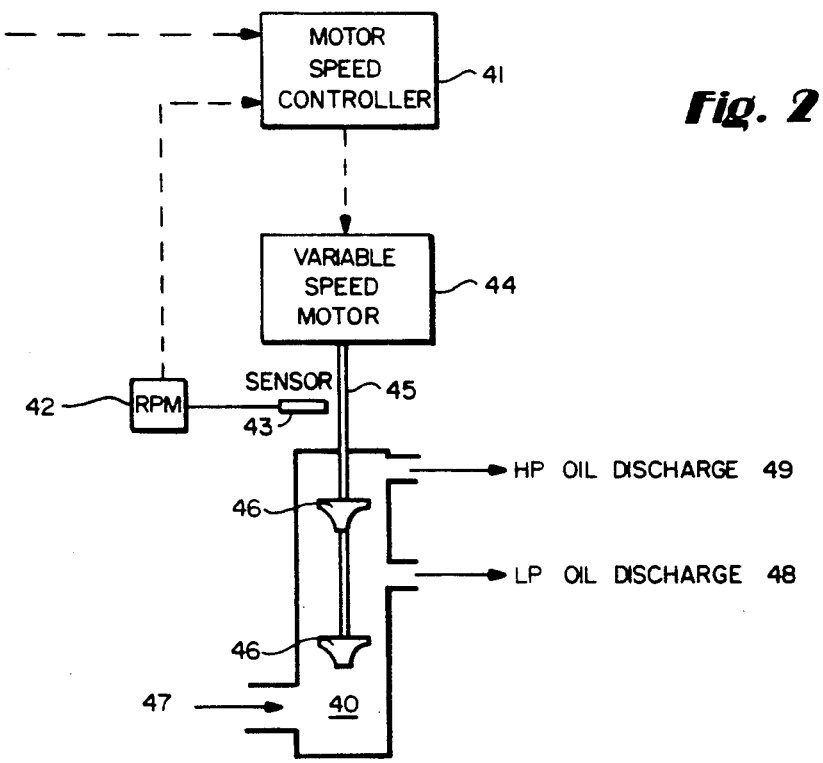

FIG. 2 illustrates one embodiment of the present adaptive oil system. FIG. 2 does not show many of the components of a lubrication system, such as the oil reservoir, filter, cooler, oil lines, that the invention shares with the typical lubrication system shown in FIG. 1. Similarly, FIG. 2 does not show the components of the propulsion system that do not directly affect the operation of the microprocessor controller 30 and oil pump 40. These other components are shown in FIG. 1.

The microprocessor controller 30 can include a central processing unit (CPU), memory registers, other memory devices, clocking components, inputs, outputs, power circuits, analog-to-digital converters, digital-to-analog converters and other components. Microprocessor controllers are well-known. There are many available microprocessors that are capable of performing the control functions for the oil pump 40.

Figure 3:
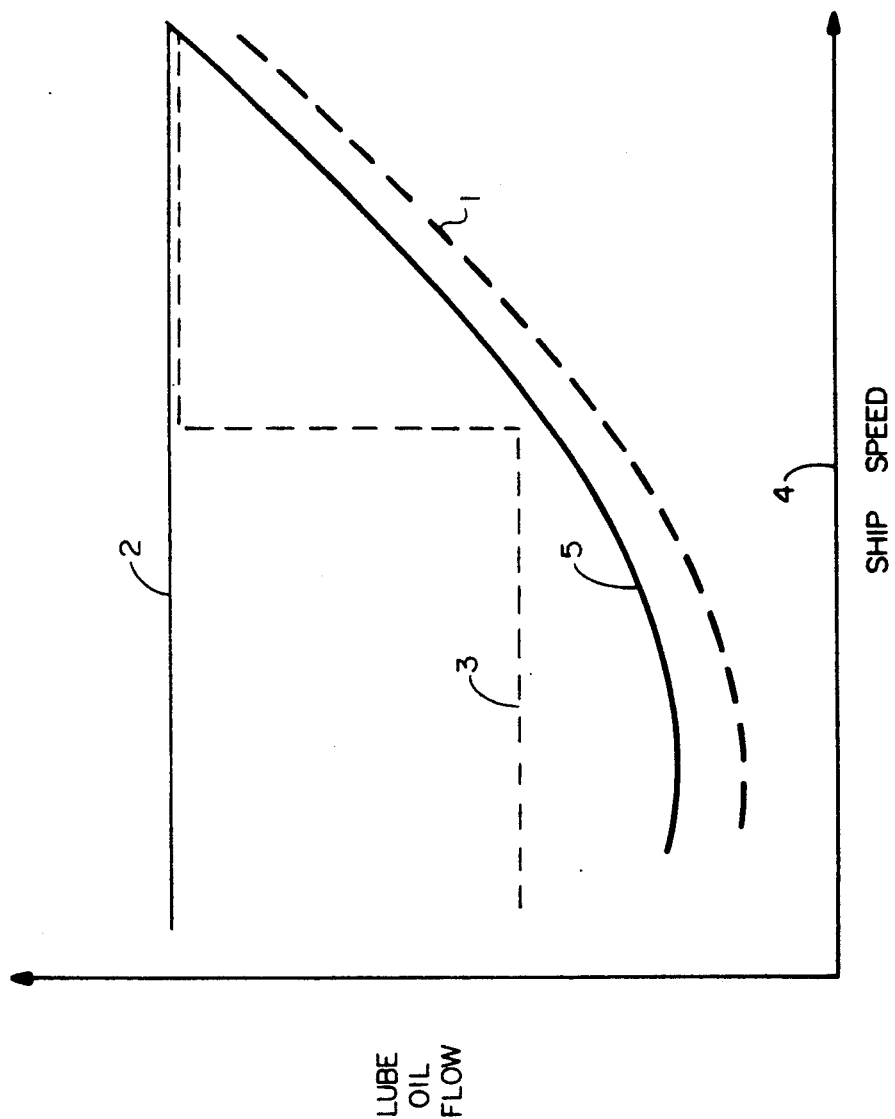
FIG. 3 is a diagram showing the relationship between the speed of a ship to the lubrication requirements of the ship's propulsion system, and the flow of lubrication oil supplied by two prior art lubrication systems and by the present invention.

The memory of the microprocessor 30 is programmed with algorithms for calculating the flow and pressure of lubricating oil required by the propulsion system and possibly other components, such as the hydraulic system. These algorithms can be mathematical functions of having factors such as the ship's speed, the rotational speed of the turbine, the setting of the turbine control valve and the throttle setting. The mathematical function may, for example, be a simple binary equation selected to model the required oil flow line 5 in FIG. 3. The selection of the appropriate algorithm depends on the individual lubricating system and propulsion system that the algorithm is to model.

Instead of a mathematical function, the microprocessor may have a look-up table correlating the operational setting of the oil pump with different settings of the turbine control valve, rotational speed of the turbine throttle, and other operating characteristics of the propulsion system. For each operational characteristic, the look-up table indicates a corresponding speed setting for the oil pump 40.

The microprocessor controller 30 receives information regarding the operational state of the propulsion system. Other components such as the hydraulic system connected to the lubrication system may be also monitored by the microprocessor controller. For example, the microprocessor 30 may receive an signal regarding the rotational speed of the propulsion turbine shaft in revolutions per minute (RPM) from a sensor 31 and an RPM data convertor 32. The RPM signal from the power turbine 22 can be used by the microprocessor to estimate of the speed of the ship assuming that the reduction gears 23 have only one setting. If the reduction gears allow for more than one gear ratio between the turbine 22 and propeller 24, then a signal (not shown) regarding the gear ratio is sent to the microprocessor to be used in calculating the speed of the ship.

Similarly, the microprocessor may receive a signal from a sensor 33 and valve position data convertor 34 regarding the setting of the turbine control valve 26. Since the turbine control valve regulates the amount of steam entering the power turbine, the setting of the valve provides information regarding the operation of the turbine. For example, opening the turbine control valve increases the amount of steam passing through the turbine and speed up the turbine, the reduction gears and propeller. By monitoring the turbine inlet valve 26, the microprocessor 30 can increase the oil flow from the pump 40 in anticipation of a greater demand for lubrication oil by the propulsion system.

Similarly, the microprocessor controller 30 receives a signal indicative of the setting of the propulsion system throttle control 35. The throttle governs the operation of the propulsion system. By monitoring the throttle, the microprocessor 30 can track the operation of the propulsion system. If the ship's captain opens the throttle to speed up the ship, then the microprocessor signals the oil pump 40 to increase its speed and the flow of lubrication oil to the propulsion system.

The adaptive oil system is not limited to steam turbines. It applies equally well to gas turbine and other propulsion systems. Whatever the type of propulsion system, appropriate sensors can input information regarding the gas turbine or other propulsion system to the microprocessor controller 30.

The microprocessor controller 30 controls the oil pump 40 through the motor speed controller 41 for the pump. The motor speed controller receives inputs from the microprocessor controller 30 regarding the desired speed of the oil pump. The motor speed controller receives a speed signal indicative of the actual rotational speed of the pump drive shaft. A rotational data convertor 42 and sensor 43 monitors the pump drive shaft and generates the speed signal received by the motor speed controller. The sensor 43 detects the rotational speed of the shaft(s) for the oil pump 40.

The motor speed controller 41 compares the desired speed of the pump to its actual speed and determines whether the pump should remain at the same speed or change speed. The motor speed controller sends a speed control signal to the variable speed motor 44 for the pump to change its speed by an amount indicated by the control signal. This speed control signal may be a difference signal indicative of the difference between the desired speed signal and actual speed signal.

The variable speed motor 44 is a well known device for powering a pump. As its name implies, a variable speed motor rotates a pump drive shaft 45 through a wide range of rotational speeds. The rotational speed of the shaft is determined by the motor speed controller 41.

In the embodiment shown in FIG. 2, the motor turns pump shaft 45. Attached to the pump shaft are two impellers 46 that impart work to the oil and thereby increase the pressure and/or flow rate of the oil. Oil enters the inlet 47 of the pump 40 and passes over one or both of the impellers 46. The inlet 47 receives oil from the oil reservoir 13. The oil exits the pump from either the low pressure (LP) oil discharge 48 or the high pressure (HP) oil discharge 49. The oil for both discharges passes through a filter 17 and a cooler 18 before entering the oil lines that direct the oil to the bearings, gears and other components needing lubrication. Oil from the LP discharge 48 may be used for lubrication while oil from the HP discharge 49 may be used in the hydraulic system.

In an alternative embodiment the pump 40 may have concentric drive shafts connecting the impellers 46 to the variable speed motor 44. Concentric shafts allow the individual impellers to rotate at different speeds. Since the rotational speed of the impellers can be set independently, the flow rate and pressure of the oil at the LP discharge 48 can be set largely independently of that of the HP oil discharge 49. The microprocessor controller 30 selects the flow and pressure selected for the HP oil independent of the flow and pressure selected for LP the oil. For example, the flow of HP oil can be increased to meet a growing need for hydraulic oil, while the flow rate for the LP oil remains constant. The adaptive oil system provides a tremendous flexibility in the operation of a lubrication system and combined lubrication and hydraulic system.

While the present invention has been described in connection with what is considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A lubrication system for a turbomachine propulsion system including a lubricated bearing comprising:
   a variable speed pump for pumping lubricant at various flow rates through said lubrication system;
   a motor speed controller varying the speed of said pump to change the lubricant flow rate; and
   a system controller operatively coupled to said motor speed controller, said system controller producing a desired speed signal in response to at least one input signal indicative of the operating condition of said turbomachine propulsion system, said system controller sending said desired speed signal to said motor speed controller to vary the speed of said pump, and said pump varying the flow rate of the lubrication through said bearing in response to said motor speed controller.

2. A lubrication system for a turbomachine propulsion system includes a propulsion turbine and turbine control value comprising:
   sensors monitoring the propulsion turbine and turbine control valve,
   a variable speed pump for pumping lubricant at various flow rates through said lubrication system;
   a motor speed controller varying the speed of said pump to change the lubricant flow rate; and
   a system controller operatively coupled to said motor speed controller, said system controller producing a desired speed signal in response to at least one input signal indicative of the operating condition of said turbomachine propulsion system, said at least one input comprises data signals from said sensors indicative of the rotational speed of said turbine and the position of said turbine control valve, said system controller sending said desired speed signal to said motor speed controller to vary the speed of said pump.

3. A lubrication system for a turbomachine propulsion system comprising:
   a variable speed pump for pumping lubricant at various flow rates through said lubrication system;
   a motor speed controller varying the speed of said pump to change the lubricant flow rate; and
   a system controller operatively coupled to said motor speed controller, said system controller producing a desired speed signal in response to at least one input signal indicative of the operating condition of said turbomachine propulsion system, said system controller sending said desired speed signal to said motor speed controller to vary the speed of said pump, wherein said turbomachine propulsion system includes a propulsion system throttle control and said input signal comprises a signal from said throttle control indicative of the throttle setting.

4. A lubrication system for a turbomachine propulsion system comprising:
   a variable speed pump for pumping lubricant at various flow rates through said lubrication system;
   a motor speed controller varying the speed of said pump to change the lubricant flow rate; and
   a system controller operatively coupled to said motor speed controller, said system controller producing a desired speed signal in response to at least one input signal indicative of the operating condition of said turbomachine propulsion system, said system controller sending said desired speed signal to said motor speed controller to vary the speed of said pump,
   wherein said motor speed controller produces a difference signal by comparing said desired speed signal from the system controller to an actual speed signal, said pump speed varying in response to said difference signal, and further comprising a sensor monitoring the rotational speed of said pump and generating said actual speed signal.

5. A lubrication system as in claim 1 wherein said pump is a two-stage pumping having high and low pressure discharges.

6. An oil lubrication system for a marine turbomachine propulsion system comprising:
   a variable speed oil pump circulating oil through said lubrication system, said pump having a drive shaft rotating at varying rotational speeds to vary the oil flow rate;
   a variable speed motor rotating said drive shaft at varying rotational speeds in response to a speed control signal;
   a motor speed controller operatively coupled to said variable speed motor generating said speed control signal in response to an actual speed signal indicative of the rotating speed of said drive shaft and a desired speed signal indicative of a selected speed for said drive shaft; and
   a microprocessor controller generating said desired speed signal in response to at least one input indicative of the operating condition of said turbomachine propulsion system, said microprocessor controller having an algorithm or look-up table for calculating said input signal as a function of the operating condition of said propulsion system.

7. An oil lubrication system as in claim 6 wherein said turbomachine propulsion system includes a propulsion turbine and a turbine control valve and said at least one input comprises a signal indicative of the rotational speed of said turbine generated by a sensor monitoring the turbine and a signal indicative of the operating position of said turbine control valve generated by a sensor monitoring the turbine control valve.

8. An oil lubrication system as in claims 6 or 7 wherein said turbomachine propulsion system includes a throttle control and said at least one input comprises a signal indicative of the operating position of said throttle generated by a sensor monitoring said throttle.

9. A combined oil lubrication and hydraulic system for a turbomachine propulsion system comprising:
   a variable speed, two-stage oil pump circulating oil through said combined system, said pump having a drive shaft rotating at varying rotational speeds to vary the oil flow rate, said pump having a high pressure discharge for circulating high pressure oil through the hydraulic system and a low pressure discharge for circulating low pressure oil through the lubrication system;
   a variable speed motor rotating said drive shaft at varying rotational speeds in response to a speed control signal;
   a motor speed controller operatively coupled to said variable speed motor generating said speed control signal in response to an actual speed signal indicative of the rotating speed of said drive shaft and a desired speed signal indicative of a selected speed for said drive shaft;

a microprocessor controller generating said desired speed signal in response to at least one status input indicative of the operating condition of said turbomachine propulsion system, said microprocessor controller having an algorithm or look-up table for calculating said desired speed signal as a function of the operating condition of said turbomachine propulsion system and said hydraulic system.

10. An oil lubrication system as in claim 9 wherein said turbomachine propulsion system includes a propulsion turbine and a turbine control valve and said at least one input comprises a signal indicative of the rotational speed of said turbine generated by a sensor monitoring the turbine and a signal indicative of the operating position of said turbine control valve generated by a sensor monitoring the turbine control valve.

11. An oil lubrication system as in claim 9 wherein said turbomachine propulsion system includes a throttle control and said at least one input comprises a signal indicative of the operating position of said throttle generated by a sensor monitoring said throttle.

* * * * *